(12) United States Patent
Hayden et al.

(10) Patent No.: US 7,773,201 B1
(45) Date of Patent: *Aug. 10, 2010

(54) ALIGNMENT OF OPTICAL SYSTEM COMPONENTS USING AN ADM BEAM THROUGH A NULL ASSEMBLY

(75) Inventors: Joseph E. Hayden, Spencerport, NY (US); Eugene G. Olczak, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 286 days.

This patent is subject to a terminal disclaimer.

(21) Appl. No.: 11/999,078

(22) Filed: Dec. 4, 2007

(51) Int. Cl.
*G01C 3/08* (2006.01)
(52) U.S. Cl. ........................ 356/4.01; 356/4.1
(58) Field of Classification Search .............. 356/3, 356/4.01, 4.1, 514, 512, 513
See application file for complete search history.

(56) References Cited

U.S. PATENT DOCUMENTS

| | | | | |
|---|---|---|---|---|
| 3,759,616 | A * | 9/1973 | Hildebrand | ............... 356/4.01 |
| 5,233,174 | A * | 8/1993 | Zmek | ...................... 250/201.9 |
| 5,973,788 | A | 10/1999 | Pettersen et al. | |
| 6,667,798 | B1 | 12/2003 | Markendorf et al. | |
| 6,714,308 | B2 * | 3/2004 | Evans et al. | ................. 356/513 |
| 7,619,720 | B1 | 11/2009 | Hayden et al. | |

* cited by examiner

*Primary Examiner*—L. G Lauchman
(74) *Attorney, Agent, or Firm*—RatnerPrestia (57) ABSTRACT

A system for testing an optical surface includes a rangefinder configured to emit a light beam and a null assembly located between the rangefinder and the optical surface. The null assembly is configured to receive and to reflect the emitted light beam toward the optical surface. The light beam reflected from the null assembly is further reflected back from the optical surface toward the null assembly as a return light beam. The rangefinder is configured to measure a distance to the optical surface using the return light beam.

32 Claims, 9 Drawing Sheets

ALIGNMENT OF OPTICAL SYSTEM COMPONENTS USING AN ADM BEAM THROUGH A NULL ASSEMBLY

STATEMENT REGARDING FEDERALLY SPONSORED RESEARCH

The invention described herein was made in the performance of work under NASA Contract No. NAS5-02200 and is subject to the provisions of Section 305 of the National Aeronautics and Space Act of 1958 (42 U.S.C. 2457).

TECHNICAL FIELD

The present invention relates, in general, to the field of optics. More specifically, the present invention relates to systems and methods for aligning and testing of optical surfaces and components.

BACKGROUND OF THE INVENTION

Metrology devices are known to measure spatial coordinates of an object under test. Examples of metrology devices include laser rangefinders, laser range scanners, photogrammetry cameras, theodolites and electronic autocollimators. For example, a laser rangefinder typically determines the spatial coordinates of the object from a laser beam reflected by points on the object under test. The laser rangefinder generally measures the spatial coordinates based on interferometry or phase detection of a modulated laser beam.

Metrology devices typically operate using a direct line-of-sight to an object under test. In some cases, metrology devices are operated in a cryogenic environment in which the metrology device is typically housed in a pressure tight enclosure (PTE) or placed outside of the cryogenic environment. In both of these circumstances, the metrology device may transmit a light beam to the object and receive a light beam reflected by the object through one or more optical windows. The optical window is typically an optical quality flat or dome window, and may degrade the measurement performance of the device.

When multiple, networked metrology devices are used to measure an object, each of the devices operate with a direct line-of-sight to the object. If the multiple devices operate in a cryogenic environment, each device may perform the measurement through a different optical window. Furthermore, if each device is placed in different enclosures of a cryogenic environment, each device may be subject to different vibrations, and may degrade the measurement performance of the networked metrology devices.

SUMMARY OF THE INVENTION

The present invention is embodied in systems for testing an optical surface. The system includes a rangefinder configured to emit a light beam and a null assembly located between the rangefinder and the optical surface. The null assembly is configured to receive the emitted light beam and to reflect the emitted light beam toward the optical surface. The light beam reflected from the null assembly is further reflected back from the optical surface toward the null assembly as a return light beam. The rangefinder is configured to measure a distance to the optical surface using the return light beam.

The present invention is also embodied in methods for testing an optical surface. The method includes emitting a light beam from a rangefinder, receiving the emitted light beam by a null assembly located between the rangefinder and the optical surface, reflecting the emitted light beam toward the optical surface by the null assembly, further reflecting the reflected light beam from the optical surface back toward the null assembly as a return light beam, and measuring a distance to the optical surface by the rangefinder using the return light beam.

BRIEF DESCRIPTION OF THE DRAWINGS

The invention may be understood from the following detailed description when read in connection with the accompanying drawing. Included in the drawing are the following figures.

DETAILED DESCRIPTION OF THE INVENTION

Figure 1:
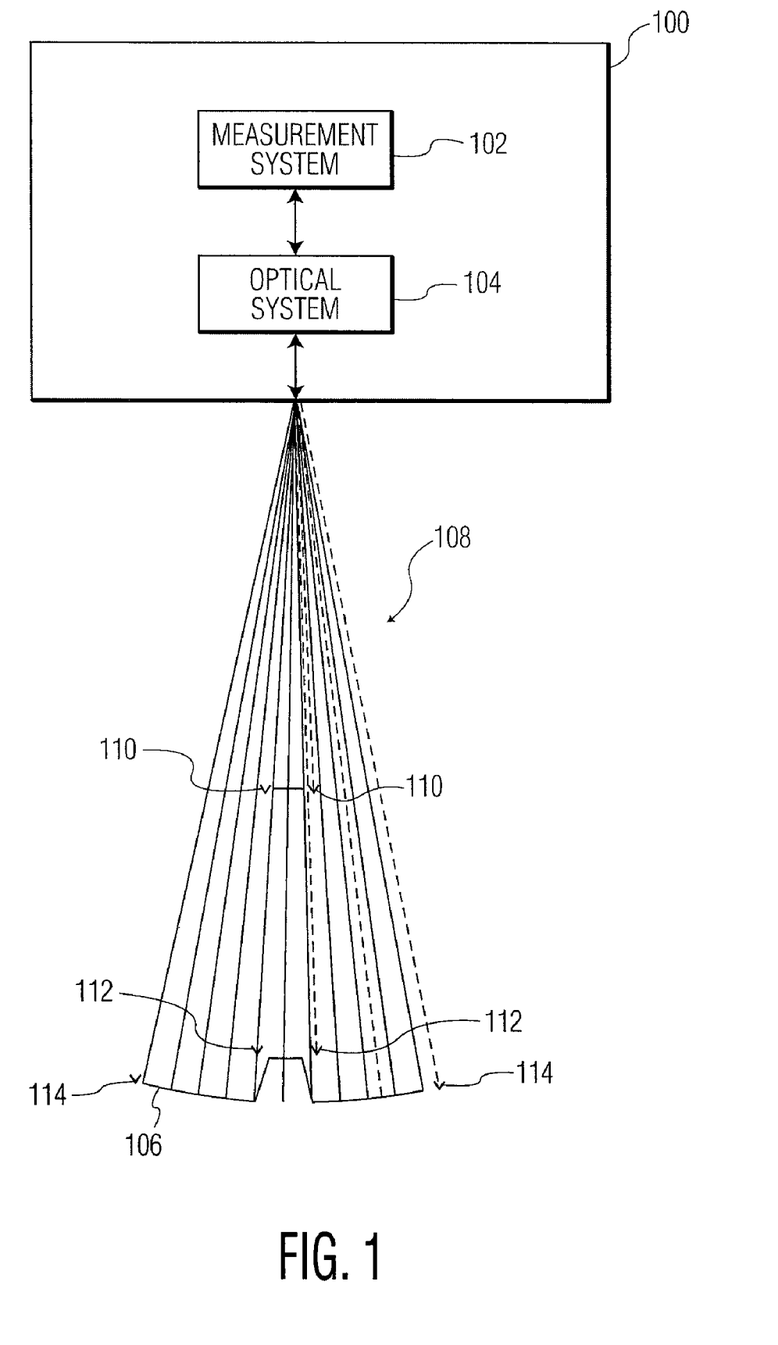
FIG. 1 shows a testing system for testing an optical surface, where the optical surface is a primary segmented mirror, according to an embodiment of the present invention.

FIG. 1 shows one embodiment of a testing system, designated generally as 100, for testing an optical surface 106, such as a reflecting surface of a primary mirror of a telescope. Testing system 100 generally includes measurement system 102 for measuring spatial coordinates of points on optical surface 106. As shown, a light beam emitted by measurement system 102 is directed by optical system 104 to predetermined points on or near optical surface 106. The emitted light beam and a light beam reflected from points on or near optical surface 106 are shown generally designated as 108. As will be explained, optical system 104 also directs the reflected light back to measurement system 102. Although optical surface 106 is illustrated as a primary mirror, it is understood that testing system 100 may be used with any suitable optical surface or any object capable of reflecting the light beam in a way that is parallel to the same light beam that is incident on the object.

Testing is defined herein as the taking of one or more measurement of the shape or position of an optical component or system of components. Each component may include one or more optical surfaces or metrology objects (such as corner cubes). The data that is produced as a result of testing may be used to certify the component or system of components, improve the alignment of one or more components, provide feedback for the physical deformation of one or more components (especially if used for the testing of deformable optics), provide feedback for additional fabrication processing of one or more one components, or for any other purpose or combination of purposes. The testing described herein may also be used in conjunction with other measurement processes including but not limited to measurements for radiometric properties, surface roughness, coating performance, thermodynamics and vibration.

Figure 3:
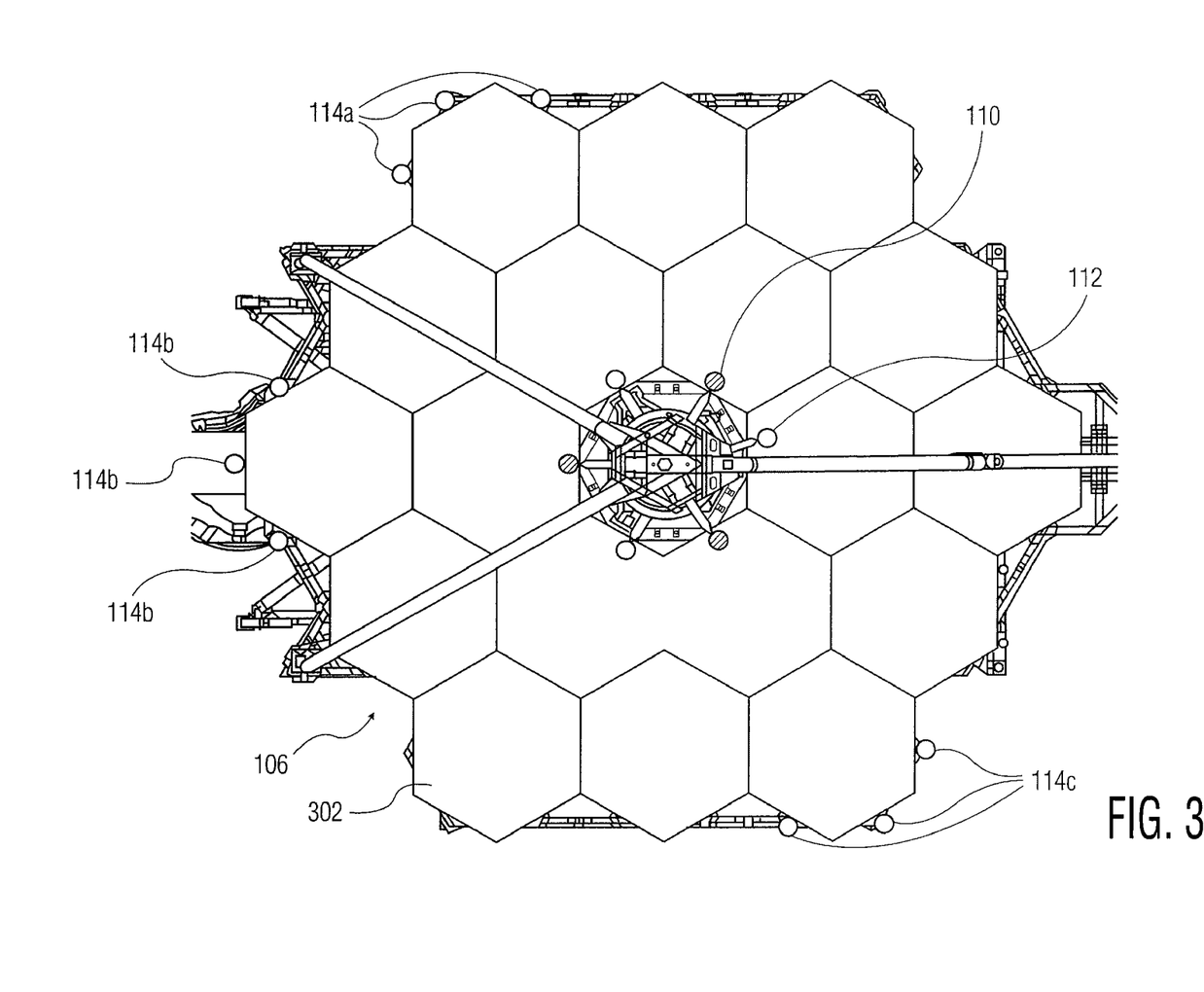
FIG. 3 shows an overhead view as seen from a center of curvature of an optical assembly (COCOA) of a segmented primary mirror having corner cubes for testing a surface of a mirror, a secondary mirror assembly (SMA) or an aft optical system (AOS), according to an embodiment of the present invention.

Emitted light beam 108 is also directed to corner cubes, designated generally as 110, 112 and 114. Corner cubes 110, 112,114 may be positioned at various predetermined locations on or above optical surface 106. In an exemplary embodiment illustrated in FIG. 1, the corner cubes may include secondary mirror assembly (SMA) corner cubes 110, aft optical system (AOS) corner cubes 112 and primary segment mirror assembly (PMSA) corner cubes 114. SMA corner cubes 110 and AOS corner cubes 112 correspond to a position of other optical and/or mechanical components associated with optical surface 106, as best shown in FIG. 3. It will be appreciated that the AOS represents a mechanical assembly, and that exemplary testing system 100 may measure the spatial coordinates of mechanical assemblies as well as optical assemblies.

Referring to FIG. 3, an overhead view of optical surface 106 illustrates the positions of SMA corner cubes 110, AOS corner cubes 112 and PMSA corner cubes 114 with respect to a center of optical surface 106 (i.e. a segmented primary mirror). In the exemplary embodiment, three PMSA corner cubes 114a, three PMSA corner cubes 114b and three PMSA corner cubes 114c are positioned at the edge of three different segments 302 of primary mirror 106. Three SMA corner cubes 110 and three AOS corner cubes 112 are positioned near the edge of optical surface 106 (see FIG. 1). It will be appreciated that corner cubes 110,112,114, when mounted to the same rigid object, allow for a six degrees of freedom (DOF) position of that object to be determined. Corner cubes 110,112,114 may be placed near optical surface 106 in any suitable geometry, such that the locations of respective corner cubes 110,112,114 relative to optical surface 106 are known.

In an exemplary embodiment, three sets of PMSA corner cubes 114a-114c provide spatial coordinates for three different segments 302 of optical surface 106. In this manner, the three associated segments 302 and, thus, the primary mirror may be adjusted for alignment. It will be appreciated that corner cubes 110,112,114 each provide six degrees of freedom (DOF) for measuring the X,Y,Z coordinates of the respective locations on or near optical surface 106. Because the relative positions of corner cubes 110,112,114 are known with respect to the assemblies to which they are respectively attached, the position and orientation of an assembly may be determined. An optical surface or object may be aligned in 6-DOF provided that three or more corner cubes are attached to the optical surface or object. It is understood that the corner cubes have known positions relative to the optical surface or object to which they are mounted.

It will be appreciated that light reflected directly from the surface of optical surface 106 may also be used to determine the spatial coordinate points on optical surface 106. For example, light may be reflected from individual segments 302 of the primary mirror in a telescope. The reflected light from the individual segments may be used for measuring the radius of any of the primary mirror segments or for phasing.

Figure 2:
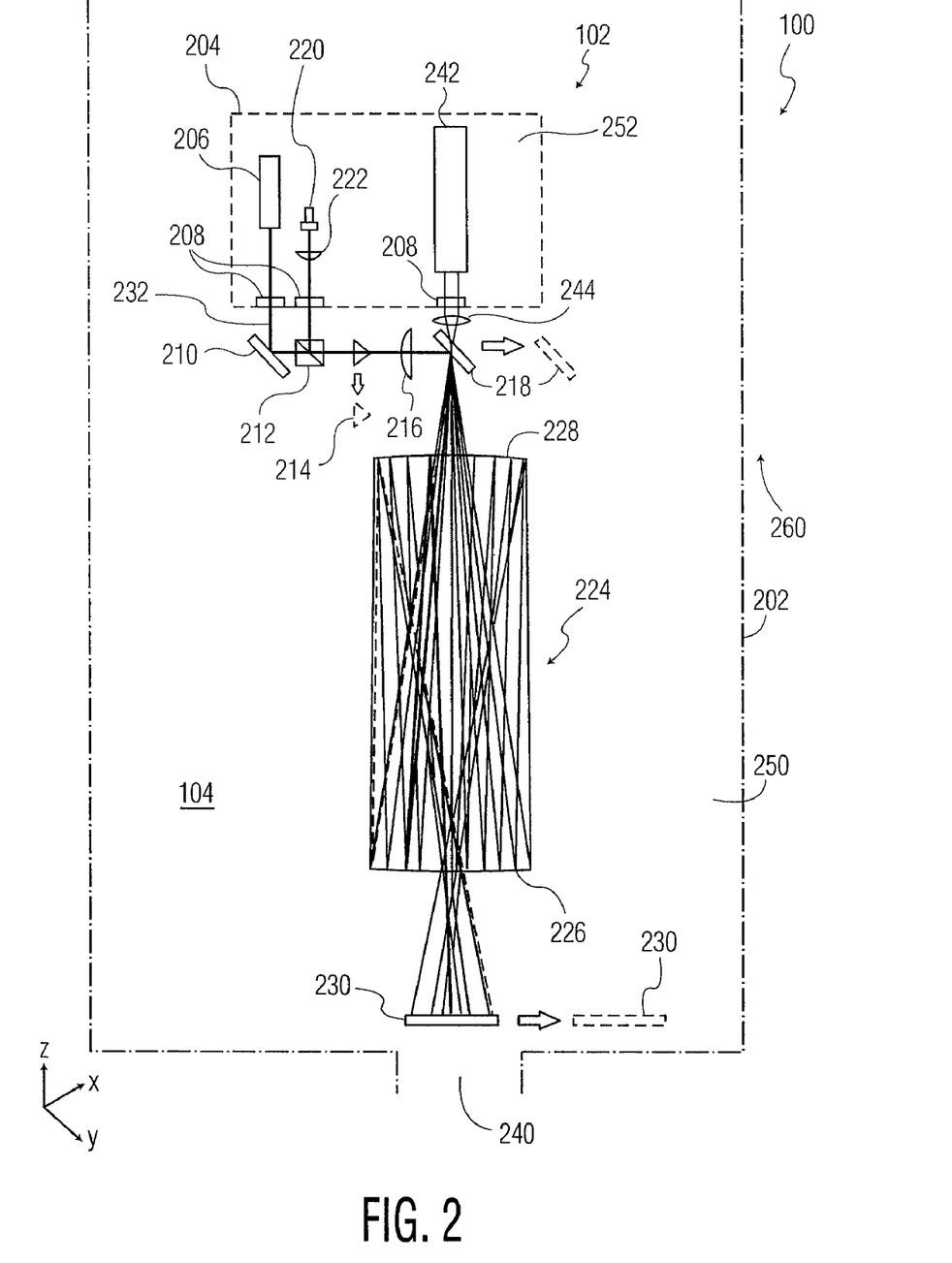
FIG. 2 is a diagram of measurement and optical systems of the testing system shown in FIG. 1, according to an embodiment of the present invention.

Referring next to FIG. 2, there is shown a diagram of components of measurement system 102 and optical system 104 included in testing system 100. Measurement system 102 and optical system 104 are each disposed within enclosure 202 having an ambient temperature and vacuum environment, designated as 250. Measurement system 102, however, is separated from environment 250 by pressure tight enclosure (PTE) 204 having an ambient environment of temperature and pressure designated as 252. Measurement system 102 communicates with optical system 104 via optical windows 208. It is understood that each of optical windows 208 may be formed from the same translucent material or from different translucent materials.

In an exemplary embodiment, ambient temperature and vacuum environment 250 includes a temperature of 293° K. and a pressure of $1 \times 10^{-6}$ Torr, whereas ambient environment 252 includes a temperature of 293° K. and a pressure of 760 Torr. In the exemplary embodiment, enclosure 202 is about 5 feet wide by 20 feet high and includes an opening 240 of about 8 inches in diameter. Light beams 108 are directed from opening 240 to optical surface 106 (FIG. 1). It is understood that enclosure 202 may be of any suitable size in order to house measurement system 102 and optical system 104. Although enclosure 202 is described as having an ambient temperature and vacuum environment, it is understood that enclosure 202 may have an ambient temperature and ambient pressure environment.

It will be appreciated that testing system 100 overcomes issues of placement within cryogenic environment 260. The pressure sensitive instrumentation of measurement system 102 are placed in PTE 204 which may be maintained at ambient temperature and pressure. On the other hand, optical system 104 may be maintained at ambient temperature under a vacuum. In addition, PTE 204 may be interferometrically stable with respect to any of the optical and/or mechanical components under measurement.

Measurement system 102 includes a range finder. The range finder may use optical radiation such as a laser or any other means to provide a measurement signal. For example if the system is used in a normal atmosphere a sonar sensor may be used. According to an exemplary embodiment, measurement system 102 uses an absolute distance meter (ADM) 206, position sensing device 220, focusing lens 222, and, optionally, a multi-wavelength interferometer 242, disposed within PTE enclosure 204. The ADM 206 combined with interferometer 242 may provide a redundant capability for coarse phasing of the segmented primary mirror by reflecting off of the highly reflective mirror surface. As shown in FIG. 2, ADM 206 and interferometer 252 are accessible through the same PTE 204.

The ADM 206 includes a laser for emitting light beam 232 and a sensor unit (not shown) for measuring the distance in the Z dimension, generally, to corner cubes 110,112,114 (or points on optical surface 106) using the reflected light beam from these respective corner cubes. In an exemplary embodiment, ADM 206 is a laser rangefinder, for example, a Leica ADM with an operational wavelength of 780 nm and a beam diameter of 10 mm. Because emitted light beam 232 is substantially transmitted in a vacuum, the measurement accuracy of ADM 206 approaches about 10 μm.

Although the ADM 206 is generally described as measuring the distance in the Z dimension, it is understood that the ADM 206 measures a known trajectory that is normal to optical surface 106 for different scanning angles of scan mirror 218. For example, the X,Y,Z coordinate of a corner cube may be determined from 1) the distance along a known trajectory, measured by ADM 206, that is normal relative to optical surface 106, 2) an azimuth angle of scan mirror 218 and 3) an elevation angle of scan mirror 218. This spatial position determination is similar to converting from a spherical coordinate system to a Cartesian coordinate system.

The ADM 206 measures the distance in the Z dimension to corner cubes 110,112,114 based on interferometry from the reflected light beam. The measurements performed by ADM 206 are substantially unaffected by transmission of light beam 232 through optical window 208. Position sensing device 220, using a similar optical window 208, determines the direction of the reflected light beam in the X and Y dimensions. Position sensing device 220 is in a closed-loop relationship with scan mirror 218 to allow precise scan mirror pointing to the vertices of corner cubes 110,112,114. For example, position sensing device 220 may determine whether the received reflected light beam is centered on a vertex in order to calibrate scan mirror 218. In general, the direction determined by position sensing device 220 is used to control scan mirror 218 to direct the emitted light beam to the various corner cubes or positions on optical surface 106 (FIG. 1).

Optical system 104 includes fold mirror 210, nonpolarizing beam splitter 212, fixed lens 216, scan mirror 218 and null assembly 224. For calibration of null assembly 224 and scan mirror 218, optical system 104 may include flip-in corner cube 214 and verification article 230. During calibration, flip-in corner cube 214 may be positioned in the path of light beam 232 and between beam splitter 212 and fixed lens 216, in order to normalize a differential path length of light beam 232 in the Z dimension, as described further below. The differential measurement is used to compare against an optical model representing the same theoretical optical system between the corner cube an the verification article 230. During calibration, verification article 230 may be positioned in the path of light beam 232 and between null assembly 224 and opening 240 of enclosure 202 for calibrating scan mirror 218 using ADM 206 and, optionally, both null assembly 224 and interferometer 242.

First, the measurement of spatial coordinates on optical surface 106 (FIG. 1) is described. In this embodiment, optical system 102 operates without flip-in corner cube 214 and without verification article 230 in the optical path. Light beam 232 from ADM 206 is directed by fold mirror 210 through beam splitter 212 to fixed lens 216. Light beam 232 is focused by fixed lens 216 and passed to scan mirror 218. An optical axis of ADM 206 and an optical axis of fixed lens 216 are then desirably centered on a pivot point of scan mirror 218. Light beam 232 then passes through null assembly 224 and is reflected from optical surface 106 (or from among corner cubes 110,112,114 (FIG. 1)).

Null assembly 224 may slightly distort emitted light beam 232. Fixed lens 216 provides a focus adjustment for light beam 232 as it impinges on optical surface 106 (FIG. 1). Fixed lens 216 focuses emitted light beam 232 to compensate for any distortion of the emitted light beam and the reflected light beam that passes through null assembly 224. Thus, emitted light beam 232 is substantially collimated. By focusing emitted light beam 232, fixed lens 216 behaves as a decollimator. Accordingly, instead of passing a light beam with a circular point spread function (PSD), fixed lens 216 may pass a light beam with a distorted PSD, such as an elliptical PSD, for example. In an exemplary embodiment, fixed lens 216 imparts a power on the collimated beam such that the beam is focused at optical surface 106.

Due to the scanning spot (the PSD is equivalent to the spot if a diffraction limited, uniform collimated beam is provided) a rastered image of (for example) the optical surface 106 may be produced. This accomplished by recording the intensity of the rangefinder return as a function of two scan angles (intensity versus X and Y scan angles for example). A smaller spot has the advantage of allowing for a higher resolution scanned image. The size of the spot at a best focus is inversely proportional to the square of the axial distance over which the spot sized can be maintained close to the minimum size (or depth of field). Accordingly, there is a tradeoff between spot size and depth of field. In practice the preferred spot size is between 100 microns and 50 millimeters, though larger spot sized may be required for very large or distant optical surfaces.

The configuration of fixed lens 216 and scan mirror 218 of an exemplary embodiment is known as a post-objective scan configuration. This is because, in following the emitted beam, the fixed lens 216 precedes scan mirror 218. Alternate configurations may use a scan mirror preceding the fixed lens and may be configured to deliver light from the rangefinder through an interferometer 242 (FIG. 2). These alternates represent examples of pre-objective scan configurations.

Figure 4A:
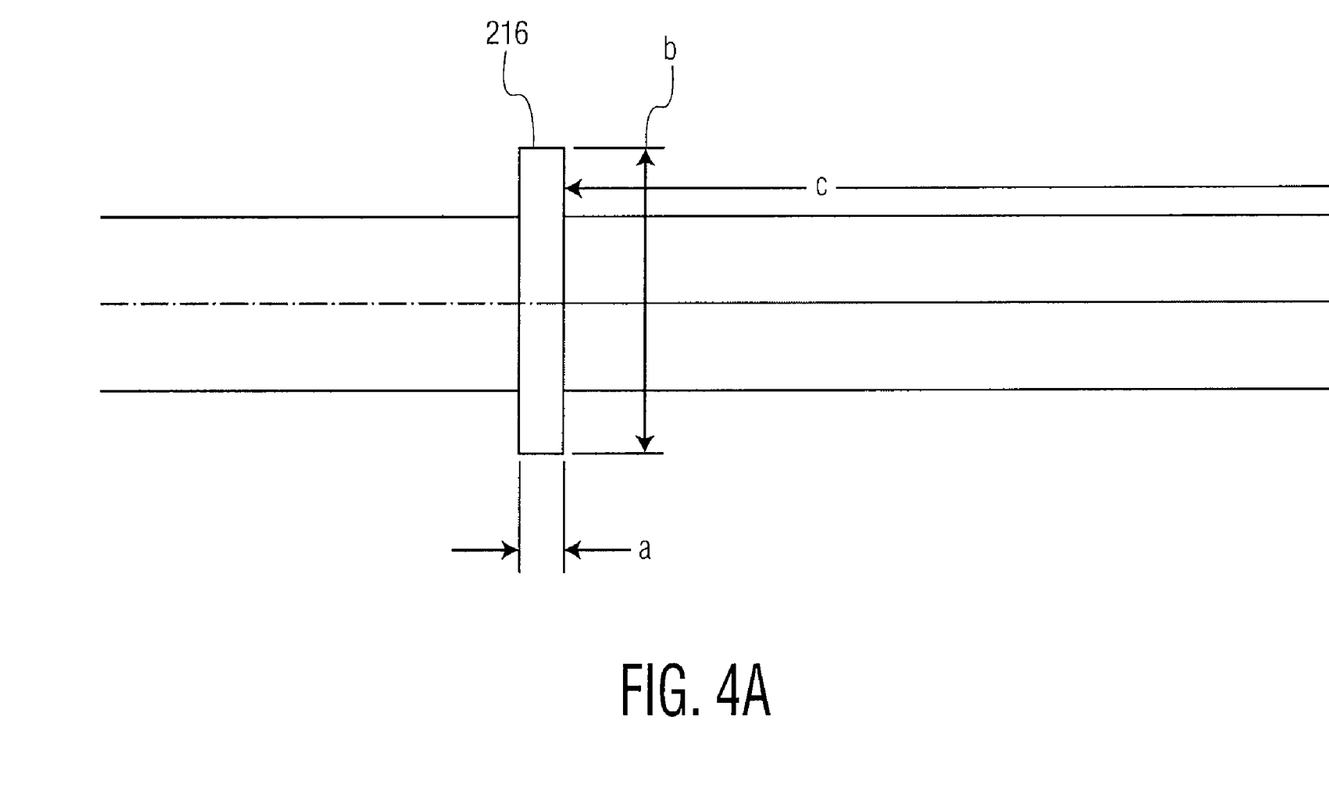
FIG. 4A shows a fixed lens for collimating light to a null assembly included in the testing system of FIG. 2, according to an embodiment of the present invention.
Figure 4B:
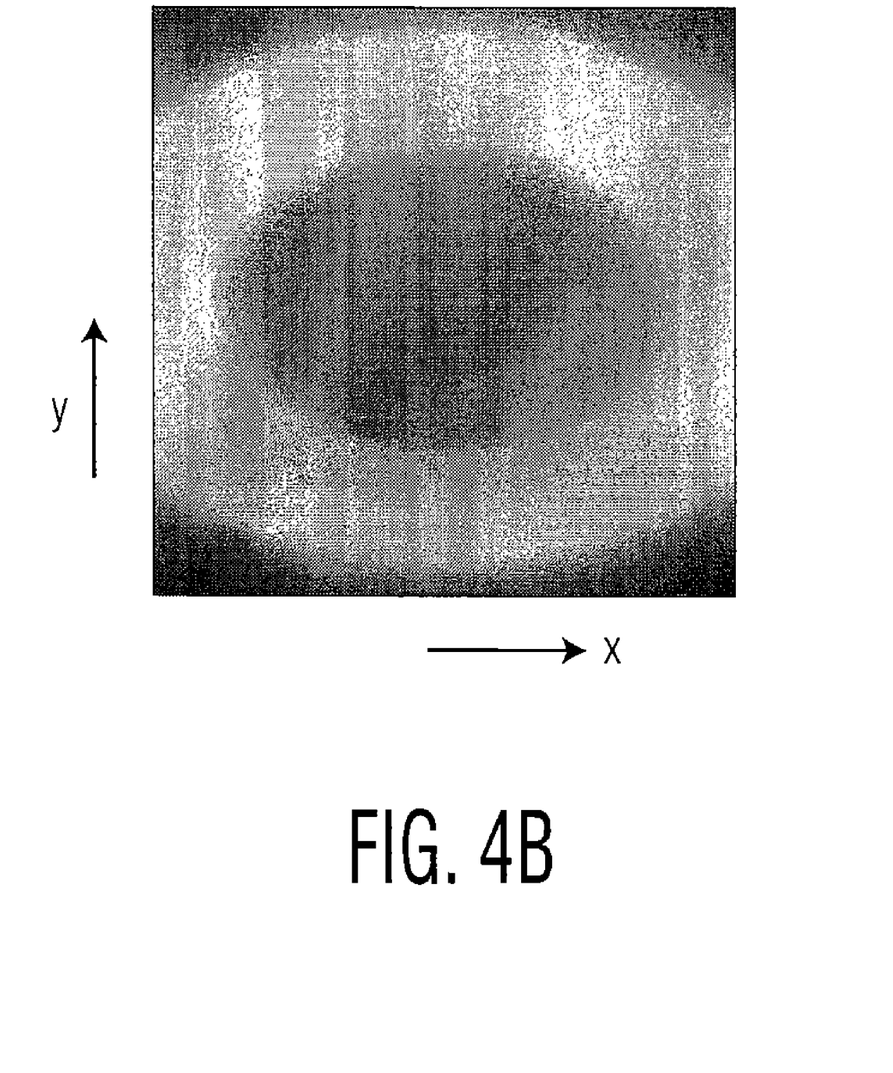
FIG. 4B is a graph of a point spread function (PSD) of an absolute distance meter (ADM) beam at the segmented primary mirror for the ADM beam passing through the exemplary fixed lens shown in FIG. 4A and the null assembly included in the testing system of FIG. 2, illustrating an elliptical shape of the ADM beam at the segmented primary mirror.

Referring respectively to FIGS. 4A and 4B, exemplary fixed lens 216 and its point spread function are shown. As shown, emitted light beam 232, which has a 10 mm diameter at 780 nm, includes a focused spot on optical surface 106 (FIG. 1) having a full width half maximum diameter as small as 3 mm. In the exemplary embodiment shown in FIG. 4A, fixed lens 216 is formed from BK7 optical glass with a focal length c of about 1 m and dimensions a,b of about 2.15 mm and 11.60 mm, respectively. For the fixed lens shown in FIG. 4A, the image size is about 3.2 mm$^2$, as shown in FIG. 4B. As shown, the PSD of the light beam at a corner cube of optical surface 106 (FIG. 1) exhibits an elliptical shape, due to off-axis propagation through null assembly 224.

Referring back to FIG. 2, scan mirror 218 directs light beam 232 to different predetermined points on optical surface 106. FIG. 2 illustrates multiple scanning directions of light beam 232 prior to entering null assembly 224. Light beam 232, which enters null assembly 224 and is reflected within the null assembly before exiting, is also directed to optical surface 106 (FIG. 1) by scan mirror 218 in a predetermined scanning direction.

Figure 5:
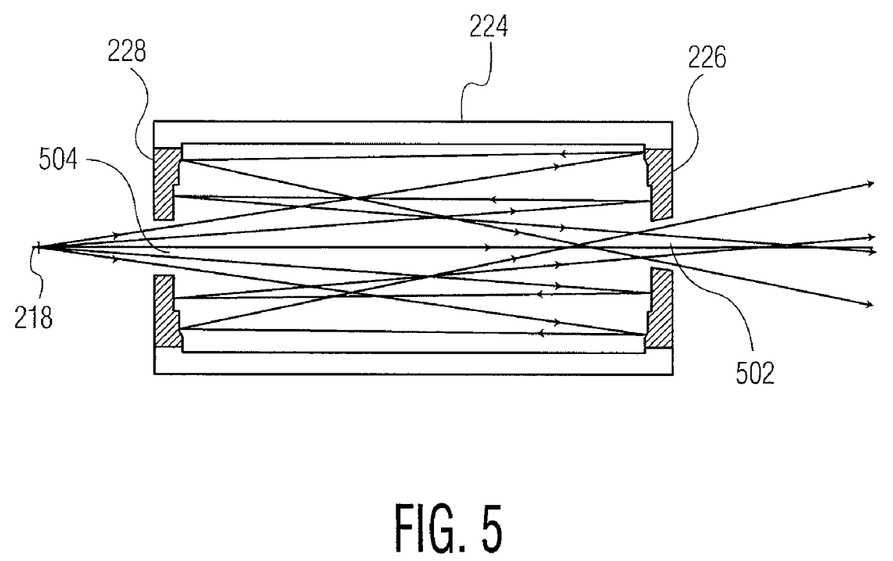
FIG. 5 shows the null assembly of the testing system shown in FIG. 2, including an aspheric mirror and a spherical imaging mirror, according to an embodiment of the present invention.

Referring now to FIG. 5, null assembly 224 for testing optical surface 106 (FIG. 1), includes aspheric mirror 226 and spherical imaging mirror 228. Light beams from scan mirror 218 enter through aperture 504 in spherical imaging mirror 228. Most of the beams from scan mirror 218, after passing through aperture 504, reflect off the surface of aspheric mirror 226, and travel back to spherical imaging mirror 228. The beams are then reflected in the other direction through aperture 502 in aspheric mirror 226, eventually reaching optical surface 106.

After reflecting from the optical surface 106, the light beams re-enter null assembly 224 by passing through aperture 502 in aspheric mirror 226, next reflecting from spherical imaging mirror 228 and then reflecting from aspheric mirror 226 to pass through aperture 504 for further processing by measurement system 102.

Referring back to FIG. 2, the light beam, after reflection from optical surface 106 and further reflection by null assembly 224 is directed to beam splitter 212 by scan mirror 218 and fixed lens 216. Beam splitter 212 passes a portion of the reflected light beam to ADM 206 and a remaining portion of the reflected light beam to position sensing device 220, via focusing lens 222. In an exemplary embodiment, beam splitter 212 reflects about 4% of the reflected light beam to position sensing device 220 and transmits the remaining 96% to ADM 206.

As described above, ADM 206 measures the distance in the Z dimension to corner cube 110,112,114 (or a point on optical surface 106) (FIG. 1), and position sensing device 220 determines the direction of the reflected light beam in the X,Y dimensions. As described further below, a bias distance from ADM 206 to flip-in corner cube 214 (L1) in the Z dimension is determined during calibration, and then the bias distance L1 is subtracted from the calculated distance to corner cubes 110,112,114 (L2) (FIG. 1). Accordingly, ADM 206 provides a measurement of distance (L1-L2) in the Z dimension from flip-in corner cube 214 to corner cubes 110,112,114.

As described above, system 100 may be used to scan the light beam to a plurality of points on optical surface 106, such as to a plurality of segments on a segmented primary mirror and to produce a corresponding rastered image from the return light beams. The rastered image may represent a variation in intensity of the return light beams, where the intensity of the return light beam for each point may be measured by position sensing device 220.

According to one embodiment, positions of points on the segmented mirror and the number of points may be selected to represent distance measurements of the entire primary mirror. According to another aspect of the present invention, the plurality of points may correspond to locations across one or more adjacent segments of the primary mirror. The rastered image may indicate a higher intensity where the light beam is reflected from a segment and a lower intensity where the light beam is reflected from a position between segments, similar to a grayscale image. Edge locations of the one or more segments may be determined from the rastered image. According to an exemplary embodiment, the edge locations may be determined to within 100 μm.

Next, the calibration of system 100 is described, with reference to FIG. 2. The path of emitted light beam 232, during calibration, is similar to the path of emitted light beam 232 during operation, except that scan mirror 218 directs emitted light beam 232 to different points on verification article 230, which is placed between null assembly 224 and opening 240 during calibration and removed to a stowed position after calibration. Verification article 230 may be used by both ADM 206 and interferometer 242 to calibrate components of optical system 104.

For example, interferometer 242 may be used to align aspheric mirror 226 and spherical imaging mirror 228 to interferometer 242 and its associated objectives. Interferometer 242 may also be used to align verification article 230 to interferometer 242 and its associated objectives. When interferometer 242 is used for calibration, scan mirror 218 is positioned away from the optical path of light beams emitted from interferometer 242. When used to align null assembly 224 and verification article 230, light from a light source (not shown) and light reflected from verification article 230 interfere with each other within interferometer 242. The resulting interference patterns provide maps of deviations of null assembly 224 and verification article 230 as compared to respective ideal surface maps. Although an interferometer 242 is illustrated, it is understood that the alignment of aspheric mirror 226 and spherical imaging mirror 228 may be performed by any suitable optical measuring device.

Figure 8:
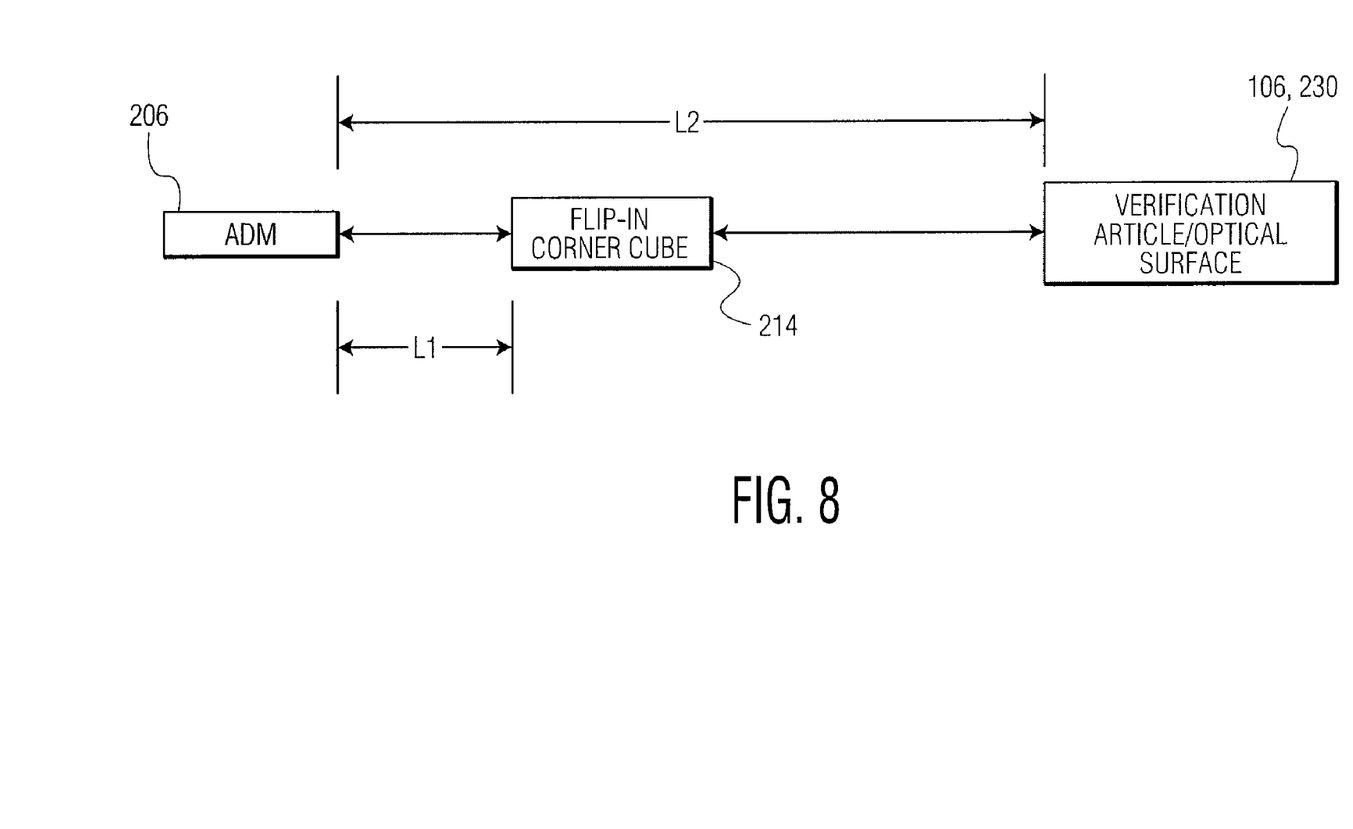
FIG. 8 shows some of the components of the testing system of FIG. 2, for determining an unbiased distance in the Z dimension to the verification article or to the optical surface, according to an embodiment of the present invention.

After null assembly 224 is aligned, the bias distance L1, shown in FIG. 8, is determined. Flip-in corner cube 214 is positioned in the optical path of emitted light beam 232. Light beam 232 from ADM 206 is directed by fold mirror 210 through beam splitter 212, toward flip-in corner cube 214. Emitted light beam 232 is reflected back from flip-in corner cube 214 to beam splitter 212. Beam splitter 212 passes a portion of the reflected light beam from flip-in corner cube 214 to ADM 206 and a remaining portion of the reflected light beam to position sensing device 220, via focusing lens 222.

ADM 206 then determines bias distance L1 in the Z dimension using the reflected light beam. In operation, as explained below, the bias distance L1 is eventually subtracted from the measured distance (L2), shown in FIG. 8, to corner cube 110,112,114 (or optical surface 106) (FIG. 1). In an exemplary embodiment, L1 is about 1.5 meters.

In addition, position sensing device 220 is used to align the optical path in the X,Y dimensions. For example, by adjusting the position of the reflected light beam on position sensing device 220 until the reflected light beam is centered on position sensing device 220.

After the bias distance L1 is determined, alignment of scan mirror 218 may be determined. Flip-in corner cube 214 is positioned away from the optical path of emitted light beam 232. The emitted light beam is then directed toward verification article 230 via fold mirror 210, beam splitter 212, fixed lens 216, scan mirror 218 and null assembly 224, as described above. Scan mirror 218 directs emitted light beam 232 at predetermined scan angles so that it is reflected from different positions on verification article 230. The reflected light beam is then directed back through the same components of optical system 102, as described above.

A portion of the reflected light beam is directed to ADM 206 and another remaining portion is directed to position sensing device 220 by beam splitter 212. The distance L2, shown in FIG. 8, in the Z dimension is determined by ADM 206 for every predetermined reflected position on verification article 230 at the corresponding predetermined scan angle of scan mirror 218.

Figure 6A:
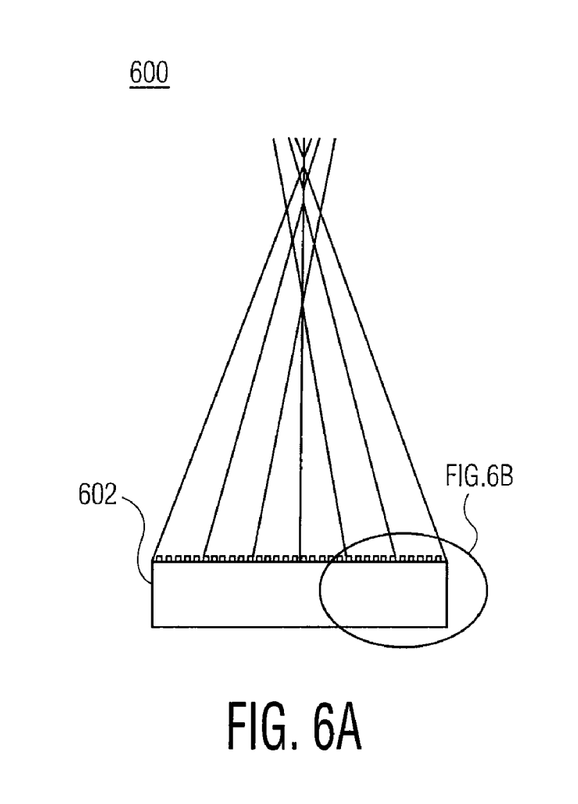
FIGS. 6A, 6B and 6C show a verification article for calibrating the exemplary testing system of FIG. 2, according to an embodiment of the present invention.
Figure 6B:
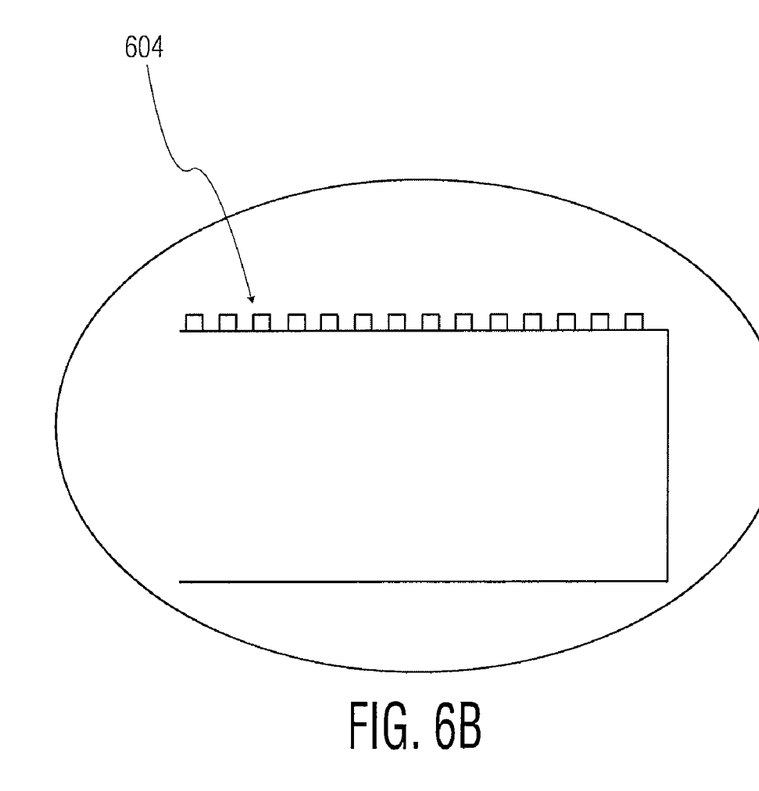
Figure 6C:
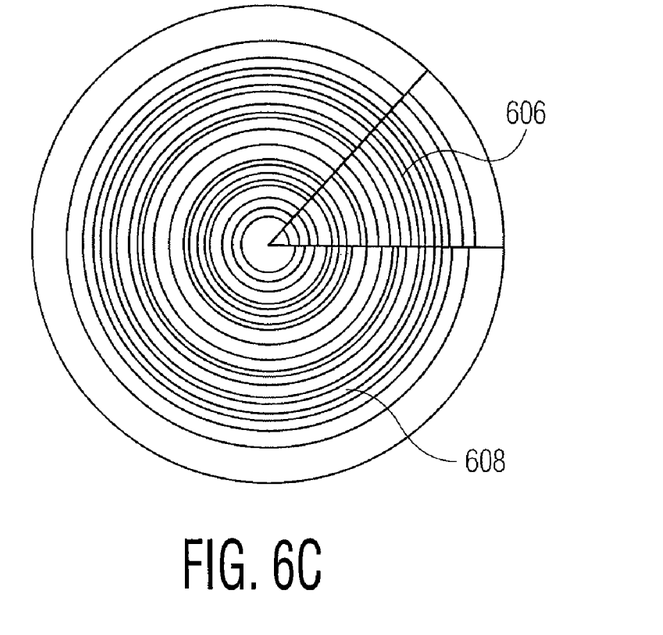

Referring to FIGS. 6A, 6B and 6C, an exemplary verification article 230 formed from an exemplary hologram 600 is illustrated. Hologram 600 includes flat glass substrate 602 with concentric rings 604 of chrome formed thereon. As shown in FIG. 6C, a portion of hologram 600 includes ring patterns 606 for a wavelength associated with ADM 206. A remaining portion of hologram 600 includes ring patterns 608 for a wavelength associated with interferometer 242. In an exemplary embodiment, ring patterns 606 correspond to a wavelength of about 780 nm and ring patterns 608 correspond to wavelengths of about 620-640 nm.

Figure 7:
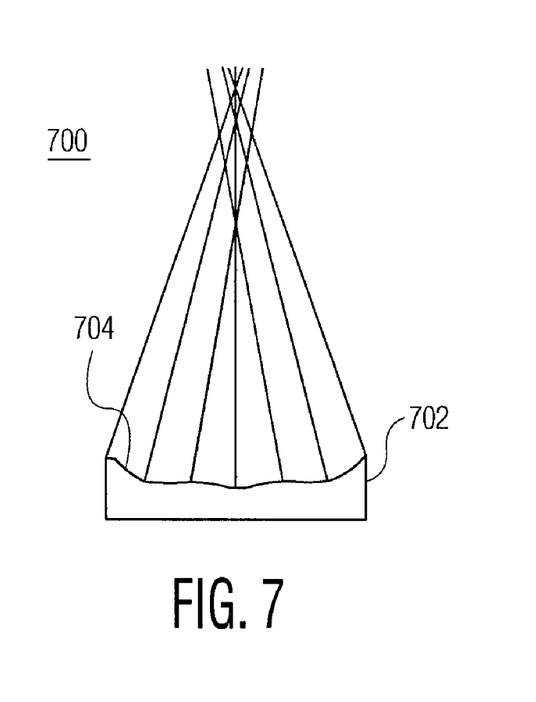
FIG. 7 shows another verification article for calibrating the optical surface testing system, according to another embodiment of the present invention.

FIG. 7 shows another verification article formed from an exemplary reflective asphere 700. Reflective asphere 700 includes glass substrate 702 and specular surface 604 disposed thereon. Reflective asphere 700 may be axially repositioned to obtain an adequate null footprint for each light beam scan angle.

Referring back to FIG. 2, a calibration procedure may be performed at each operational temperature to establish relationships among the L2 distance measurements in the Z dimension, the scan angles of scan mirror 218, the position of the emitted light beam 232 on verification article 230, and the magnitude and direction of the emitted light beam 232 between the verification article and any corner cubes being observed.

Distances L1 and L2 may each be represented as a function of the predetermined positions in the X,Y dimensions as $L1(x_i,y_i)$ and $L2(x_i,y_i)$, where i represents an index of the predetermined positions. First, a difference, $\Delta L_{ADM}$, between distances L1 and L2 as unbiased distance measurements for each predetermined position may be obtained as:

$$\Delta L(x_i,y_i)_{ADM}=L1(x_i,y_i)-L2(x_i,y_i)$$

Next, the unbiased distance measurements are compared to ideal distances, $\Delta L(x_i, y_i)_{IDEAL}$ for each predetermined position. The ideal distances are determined by modeling the path of an ideal light beam from flip-in corner cube 214 to the predetermined positions on the verification article, with the ideal light beam passing through null assembly 224. The modeling may be determined, for example, by ray tracing.

The unbiased distance measurements are then compared to the ideal distances, for example, by applying a least-squares fit between the unbiased measurements and the ideal measurements. For example, the least-squares fit approach may be used to determine $\delta x_i, \delta y_i$, such that:

$$\Delta L(x_i+\delta x_i,y_i+\delta y_i)_{ADM}=\Delta L(x_i,y_i)_{IDEAL}.$$

The terms $\delta x_i, \delta y_i$ represent deviations of scan mirror 218 from the ideal distances for each predetermined position i. Accordingly, scan mirror 218 may be adjusted and the distance L2 for the corresponding position re-measured until the unbiased distance measurement $\Delta L_{ADM}$ approaches the ideal measurement $\Delta L_{IDEAL}$. It is understood that any suitable regression analysis may be used to adjust scan mirror 218 so that the unbiased distance measurements substantially agree with the ideal modeled distances. In this manner, the calibration procedure for ADM 206 calibrates the scan angle of scan mirror 218 to a number of predetermined positions, as well as the distance L2 in the Z dimension to the same predetermined positions.

Applications of the present invention include optical systems that use a null assembly for testing or aligning optical surfaces in ambient or cryogenic environments. Although null assembly 224 is described as including aspherical and spherical components, null assembly 224 may also include reflective and/or refractive components. In addition, emitted light beam 232 may be scanned at a back focus of an interferometer objective lens (not shown) using another scan apparatus having a scan mirror and optics for a pre-objective scan.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for testing an optical surface comprising:
   a rangefinder configured to emit a light beam; and
   a null assembly located between the rangefinder and the optical surface and configured to receive the emitted light beam,
   wherein the null assembly is configured to reflect the emitted light beam toward the optical surface,
   the light beam reflected from the null assembly is further reflected back from the optical surface toward the null assembly as a return light beam, and
   the rangefinder is configured to measure a distance to the optical surface using the return light beam.

2. The system according to claim 1, wherein the system is configured to determine an alignment the optical surface.

3. The system according to claim 1, wherein the rangefinder includes a laser rangefinder or a sonar rangefinder.

4. The system according to claim 1, the null assembly comprising:
   an aspheric mirror having a reflecting surface for reflecting the received emitted light beam; and
   an imaging mirror disposed between the rangefinder and the aspheric mirror, the imaging mirror configured to again reflect light, which is first reflected from the reflecting surface of the aspheric mirror, toward the optical surface.

5. The system according to claim 1, further comprising:
   a fixed lens disposed between the rangefinder and the null assembly, the fixed lens positioned along an optical axis of the emitted light beam,
   wherein the fixed lens decollimates the emitted light beam according to a predetermined point spread function.

6. The system according to claim 5, wherein the fixed lens imparts a power on the emitted light beam such that the emitted light beam is focused at the optical surface.

7. The system according to claim 1, wherein the optical surface includes a verification article for calibrating the system.

8. The system according to claim 7, wherein the verification article includes a hologram or a reflecting asphere.

9. The system according to claim 1, wherein the optical surface includes a segmented mirror.

10. The system according to claim 9, wherein the system is configured to measure distances to the entire segmented mirror.

11. The system according to claim 9, wherein the system is configured to scan the emitted light beam over a plurality of locations on the segmented mirror to generate a plurality of return light beams, and
    the system is configured to determine a distance to one or more edges of segments of the segmented mirror based on a variation in intensity among the plurality of return light beams.

12. The system according to claim 1, wherein the optical surface includes one or more corner cubes positioned at predetermined locations relative to the optical surface,
    the emitted light beam reflected toward the optical surface from the null assembly is reflected back from the one or more corner cubes as the return light beam, and
    the system measures the distance to the optical surface using the return light beam reflected from the one or more corner cubes.

13. The system according to claim 1, wherein the rangefinder is provided within a pressure tight enclosure (PTE) having an ambient pressure environment and the null assembly is provided in an enclosure having a vacuum environment or an ambient pressure environment.

14. The system according to claim 1, further comprising:
    a scan mirror disposed between the rangefinder and the null assembly, a pivot point of the scan mirror centered at an optical axis of the emitted light beam,
    wherein the scan mirror is configured to direct the emitted light beam to a predetermined location on or near the optical surface according to a predetermined scan angle.

15. The system according to claim 14, wherein a spatial position of the optical surface is determined from the distance measured by the rangefinder, an azimuth angle of the scan mirror and an elevation angle of the scan mirror.

16. The system according to claim 14, further comprising:
    a position sensing device configured to determine a direction of the return light beam, the position sensing device configured with the scan mirror to direct the emitted light beam to the predetermined location; and a beam splitter positioned between the rangefinder and the scan mirror and aligned with the optical axis of the emitted light beam, the beam splitter configured to pass a first portion of the return light beam to the rangefinder and a second portion of the return light beam to the position sensing device.

17. The system according to claim 16, further comprising:
a corner cube positioned between the beam splitter and the scan mirror and configured to reflect the emitted light beam toward the beam splitter as a calibration light beam,
wherein a position of the position sensing device is calibrated using the calibration light beam, and
a bias distance between the rangefinder and the corner cube is determined, the bias distance being subtracted from the measured distance to the optical surface.

18. A method of testing an optical surface comprising the steps of:
(a) emitting a light beam from a rangefinder;
(b) receiving the emitted light beam by a null assembly located between the rangefinder and the optical surface;
(c) reflecting the emitted light beam toward the optical surface by the null assembly;
(d) further reflecting the reflected light beam from the optical surface back toward the null assembly as a return light beam; and
(e) measuring a distance to the optical surface by the rangefinder using the return light beam.

19. The method according to claim 18, the method including, prior to step (a), performing an alignment of the optical surface.

20. The method according to claim 18, step (a) further comprising:
decollimating the emitted light beam according to a predetermined point spread function by a fixed lens disposed between the rangefinder and the null assembly, the fixed lens positioned along an optical axis of the emitted light beam.

21. The method according to claim 20, the step of decollimating including decollimating the emitted light beam by imparting a power on the emitted light beam such that the emitted light beam is focused at the optical surface.

22. The method according to claim 18, step (d) further comprising:
positioning one or more corner cubes at predetermined locations relative to the optical surface,
wherein the reflected light beam from the null assembly is further reflected back from the one or more corner cubes as the return light beam, and
the distance to the optical surface is measured using the return light beam reflected from the one or more corner cubes.

23. The method according to claim 18, step (a) further comprising:
directing the emitted light beam to one or more predetermined locations on or near the optical surface by a scan mirror,
wherein the scan mirror is positioned between the rangefinder and the null assembly, a pivot point of the scan mirror centered at an optical axis of the emitted light beam, and
the distance to the one or more predetermined locations is measured by the rangefinder.

24. The method according to claim 23, further including determining a spatial position of each of the one or more predetermined locations from the distance to the corresponding predetermined location measured by the rangefinder, an azimuth angle of the scan mirror for the corresponding predetermined location and an elevation angle of the scan mirror corresponding predetermined location.

25. The method according to claim 23, wherein optical surface includes a segmented mirror and distances representing the entire segmented mirror are measured by the rangefinder.

26. The system according to claim 23, wherein the optical surfaces includes a segmented mirror and the method includes, the one or more predetermined locations include a plurality of locations on the segmented mirror to generate a plurality of return light beams, the method including:
determining a distance to one or more edges of segments of the segmented mirror based on a variation in intensity among the plurality of return light beams.

27. The method according to claim 23, the method comprising, prior to step (a):
positioning a corner cube between the rangefinder and the scan mirror, the corner cube centered on the optical axis, the distance between the rangefinder and the corner cube representing a bias distance;
emitting a calibration light beam from a rangefinder;
reflecting the calibration light beam from the corner cube back to the rangefinder; and
measuring a bias distance by the rangefinder from the reflected calibration light beam,
wherein step (e) includes subtracting the bias distance from the measured distance to the optical surface.

28. The method according to claim 27, wherein a beam splitter is positioned between the rangefinder and the corner cube, the method further comprising:
directing a first portion of the reflected calibration light beam to the rangefinder, the rangefinder measuring the bias distance from the first portion of the reflected calibration light beam;
directing a second portion of the reflected calibration light beam to a position sensing device;
determining a position of the second portion of the reflected calibration light beam on the position sensing device; and
adjusting an alignment of the position sensing device based on the determined position of the second portion of the reflected calibration light beam.

29. The method according to claim 28, further comprising:
controlling a tip angle and a tilt angle of the scan mirror such that the return light beam is centered on the position sensing device.

30. The method according to claim 27, wherein the optical surface is a verification article configured to calibrate the scan mirror, the method further comprising:
comparing the measured distance for each of the one or more predetermined locations to respective predetermined distances; and
for each of the one or more predetermined locations, adjusting a scan angle of the scan mirror until the corresponding measured distance is substantially similar to the respective predetermined distance.

31. The method according to claim 30, wherein the predetermined distances are determined by ray tracing modeling of the emitted light beam directed through the null assembly and directed toward the one or more predetermined locations on the verification article.

32. The method according to claim 30, wherein the measured distance is compared to the respective predetermined distance based on a least-squares fit method.

* * * * *